W. H. THIEMER.
UNIVERSAL JOINT.
APPLICATION FILED JUNE 20, 1919.

1,421,617.  Patented July 4, 1922.

Inventor,
William H. Thiemer,
By Hill, Smith, Brock & West
Attys.

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,421,617.      Specification of Letters Patent.      Patented July 4, 1922.

Application filed June 20, 1919. Serial No. 305,643.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and more particularly to joints of the ring-and-yoke type. The general object of the invention is to provide a joint of this character which is simple of construction and which may be conveniently assembled and disassembled, and which is provided with means for efficiently lubricating the journals for the trunnions.

Figure 1:
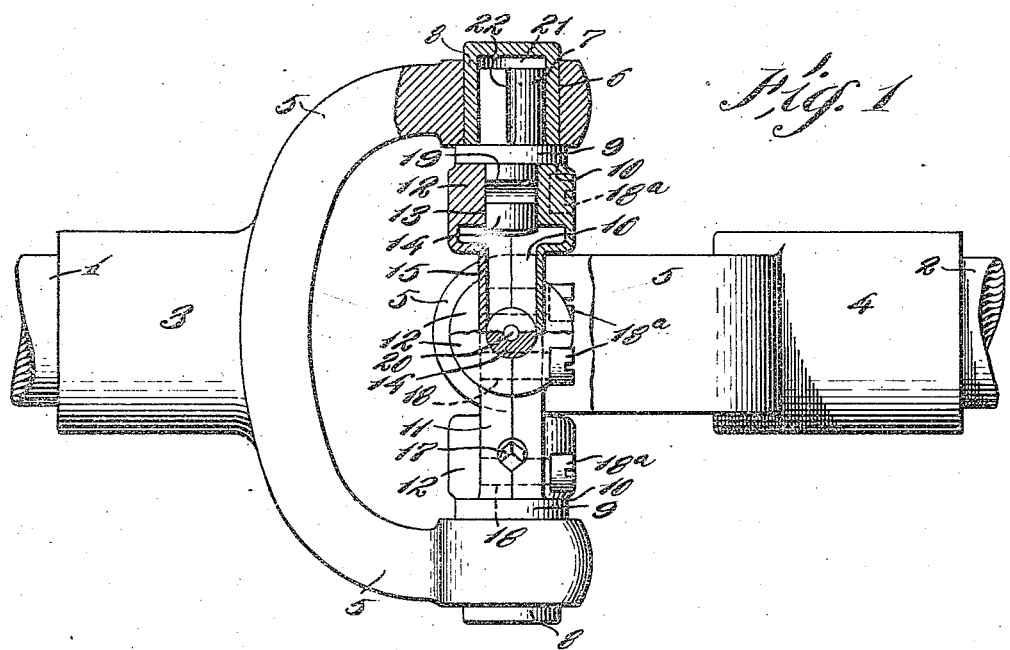
Figure 2:
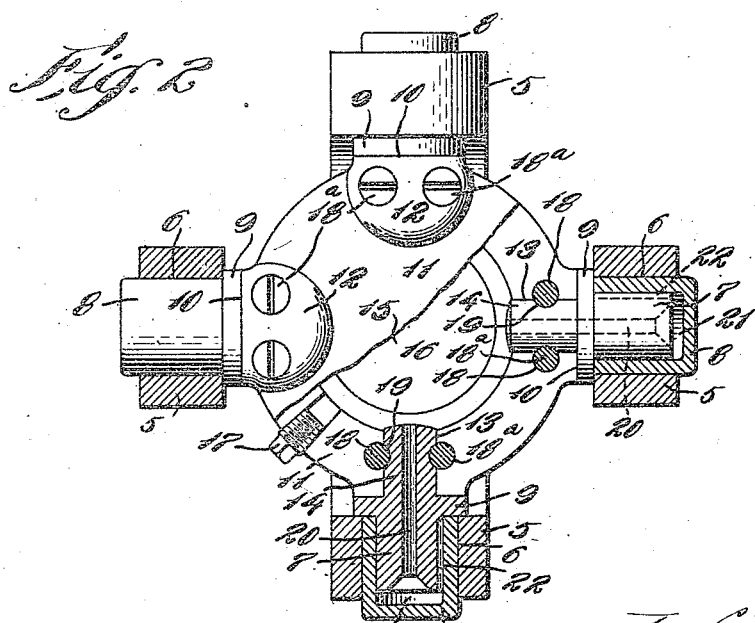

In the drawings forming part hereof, Fig. 1 represents a sectional side elevation of a joint of this character, together with the co-operating portions of the shaft sections connected thereby; and Fig. 2 is a view, partly in elevation and partly in section, of the joint proper.

Describing by reference characters the various parts illustrated herein, 1 and 2 denote a pair of shaft sections having the hubs 3 and 4 respectively, each hub carrying a yoke 5, the arms whereof are provided each near its outer end with a bore 6. Mounted in each bore 6 is a trunnion 7, the said trunnions preferably terminating within the outer surface of each arm and being surrounded by a blind or capped bushing 8. Each trunnion 7 is provided with an annular shoulder 9 adapted to bear at its outer surface against and form a tight joint with the inner surface of the arm 5, surrounding the inner end of the bore thereof, the inner surface of said shoulder bearing against and forming a tight joint with an outer annular surface 10 of the connecting ring, indicated generally at 11.

The connecting number or ring comprises two annular symmetrical sections adapted, when connected, to provide a complete connecting member or ring. When the two sections of this member are assembled, there is provided a complete connecting member having four outwardly expanded portions 12, each portion having a bore 13 for the reception of a pin or stud 14 constituting an inwardly directed extension of a trunnion 7. Between these expanded portions, the exterior of the ring is reduced in width, the central portion of each ring section being formed with a cover plate 15, said plates providing within the ring a central chamber 16 for lubricant, which may be conveniently inserted into the ring through an opening closed by a removable filling plug 17, shown as threaded into a bore formed jointly in the ring sections.

On each side of each bore 13, one of the sections is provided with recesses 18 adapted to receive the heads or screw bolts 18ª, threaded into the other section. The holes for these screw bolts intersect the opposite sides of each bore and the bolts extend through grooves 19 provided in opposite sides of each pin or stud 14, thereby anchoring the trunnions in place.

For the purpose of conducting lubricant by centrifugal action from the chamber 16 through the journals for the trunnions, each trunnion is provided with an axial bore 20 extending therethrough and through the pin or stud extension thereof, the outer end of the bore communicating with a well 21 provided between the outer end of the trunnion and the cap for its bushing. By means of a port 22, preferably formed in the outer wall of each trunnion, the lubricant from the wells 21 is distributed to the space between each trunnion and its bushing.

Having thus described my invention, what I claim is:

1. In a universal joint, the combination of a pair of yokes each having arms provided each with a bore, a two-part connecting member having openings adapted to register with said bores, a trunnion mounted in each bore and having a pin or stud adapted to be received within the opening corresponding to such bore, there being a shoulder interposed between each trunnion and its stud or pin adapted to bear at opposite sides against the inner surface of an arm and the outer surface of said member, respectively, a bushing surrounding each trunnion in its bore and having its outer end closed to provide a well beyond its trunnion, the said connecting member having a central well for lubricant, and means for supplying lubricant from said well through each trunnion and its pin or stud to the well provided within each bushing.

2. In a universal joint, the combination of a pair of yokes each having arms provided each with a bore, a trunnion mounted in each bore and having a pin or stud projecting inwardly therefrom, a two-part connecting member having bores provided between the two parts thereof adapted to receive said pins or studs, each pin or stud having a groove in its outer surface, and a bolt connecting the two parts of said member and extending through said groove.

3. In a universal joint, the combination of a pair of yokes each having arms provided each with a bore, a trunnion mounted in each bore and having a pin or stud projecting inwardly therefrom, a two-part connecting member having bores provided between the two parts thereof adapted to receive said pins or studs, and means for securing together the two parts of said member and for preventing rotation of said pins or studs with respect to said connecting member.

In testimony whereof, I hereunto affix my signature.

WILLIAM H. THIEMER.